United States Patent [19]

Fukahori et al.

[11] Patent Number: 4,978,581
[45] Date of Patent: Dec. 18, 1990

[54] ANTI-SEISMIC BEARING

[75] Inventors: Yoshihide Fukahori, Hachioji; Hiromu Kojima, Higashimurayama; Akihiko Ogino, Kodaira, all of Japan

[73] Assignee: Bridgestone Construction, Tokyo, Japan

[21] Appl. No.: 223,189

[22] Filed: Jul. 22, 1988

Related U.S. Application Data

[63] Continuation-in-part of Ser. No. 7,302, Jan. 27, 1987, Pat. No. 4,830,927.

[30] Foreign Application Priority Data

Jul. 27, 1987 [JP] Japan ............................... 62-187288
Dec. 1, 1987 [JP] Japan ............................... 62-303483

[51] Int. Cl.$^5$ ...................... B32B 15/06; E04B 1/98; F16M 13/00
[52] U.S. Cl. ................................... 428/492; 428/462; 428/465; 428/521; 248/560; 248/609; 248/621; 52/167 R; 52/167 DF; 525/331.9
[58] Field of Search ............... 429/492, 493, 494, 495, 429/497, 460, 462, 465, 521, 524; 248/609, 560, 621; 52/167 R, 167 DF; 525/331.9, 332.5

[56] References Cited

U.S. PATENT DOCUMENTS 2,572,160  4/1945  Kelly, Jr. et al. .................. 403/228
3,387,057  6/1968  Neuworth et al. ................. 524/349
4,594,381  6/1986  Davis ................................. 524/396
4,761,925  8/1988  Fukahori et al. .................... 52/167

Primary Examiner—George F. Lesmes
Assistant Examiner—Christopher Brown
Attorney, Agent, or Firm—Kanesaka and Takeuchi

[57] ABSTRACT

An anti-seismic bearing which comprises a plurality of rigid plates and viscoelastic flexible plates laminated alternately, with at least one of the flexible plates being made of a vulcanizate of a high-loss rubber compound composed of 100 parts by weight of rubber and 3 to 40 parts by weight of phenolic resin having a softening point or melting point of 150° C. or below, the vulcanizate having the properties specified below.
(i) The hysteresis ratio at 100% tensile deformation at 25° C. is 0.2 to 0.7.
(ii) the ratio $E_{(-10)}/E_{(30)}$ is 1.0 to 2.5, where $E_{(-10)}$ is a storage modulus at $-10°$ C. and $E_{(30)}$ is a storage modulus at 30° C., both dynamically measured at 5 Hz and 0.01% strain.

15 Claims, 11 Drawing Sheets

FIG. IA
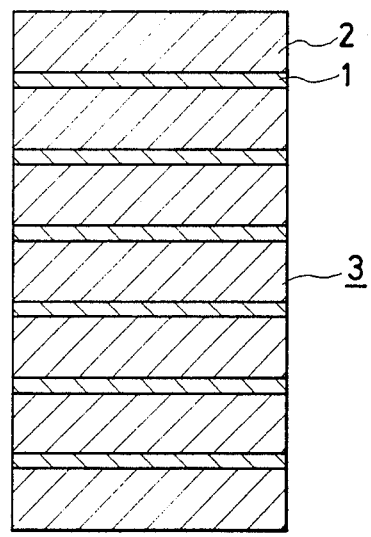
FIG. IB
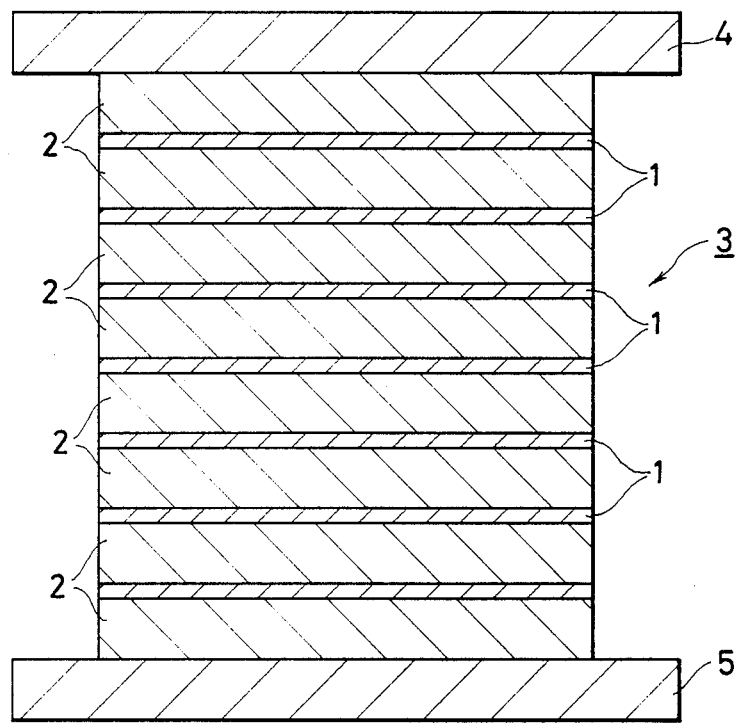

ANTI-SEISMIC BEARING

This is a continuation-in-part application of U.S. Ser. No. 007,302, filed Jan. 27, 1987 now U.S. Pat. No. 4,830,927.

FIELD OF THE INVENTION AND RELATED ART STATEMENT

The present invention relates to an anti-seismic bearing composed of a plurality of rigid plates and viscoelastic flexible plates bonded to each other alternately. More particularly, it relates to an anti-seismic bearing which produces both an anti-seismic effect and a damping effect.

An anti-seismic bearing of laminate structure composed of rigid plates such as steel plates and viscoelastic flexible plates such as rubber plates is in general use as a supporting member which is required to have the properties of insulating and absorbing vibrations.

An anti-seismic bearing like this exhibits its function and effect when it is inserted between a rigid concrete building and a foundation thereof. Since the anti-seismic bearing is deformable in the lateral direction and has low shear modulus, it shifts the natural period of the concrete building it supports from the seismic period. This extremely reduces the acceleration of earthquake the building receives. Nevertheless, the building is still subject to slow transverse oscillation, which, when great, would cause damage to the building, piping, wiring, and other equipment. To reduce the displacement caused by transverse oscillation, anti-seismic bearings are installed in combination with dampers. However, the parallel installation of anti-seismic bearings and dampers needs complex works and adds to cost to a great extent. A conceivable way to avoid this situation is to hollow out the anti-seismic bearing and fill the hollow with lead. Lead undergoes plastic deformation at the time of earthquake, allowing the anti-seismic bearing to produce a damping effect, too. A disadvantage of the lead-containing anti-seismic bearing is that when it is greatly deformed by an energetic earthquake, the rigid plates such as steel plates damage the lead and the damaged lead in turn damages the flexible plates such as rubber plates, with the series of damages eventually breaking the entire anti-seismic bearing. In addition, the damaged lead is readily broken by repeated large deformation.

There is a problem in the case where anti-seismic bearings are used in combination with plastic dampers made of a soft metal which undergoes plastic deformation immediately when it receives a seismic force. That is, although the plastic dampers absorb more seismic energy, they bring about resonance in the high-frequency region on account of their high modulus.

Means to relieve or absorb vibration energies is usually made of a rubber compound having high-loss characteristics. The rubber compound for this application is incorporated with a large amount of carbon to impart the high-loss characteristics and also with a considerably large amount of softener such as oil to improve processability and to impart a good elongation. It is known that a large amount of carbon improves the loss characteristics of a rubber compound but it also extremely impairs the processability and decreases the elongation at break. To remedy this adverse effect of carbon, a rubber compound is usually incorporated with a large amount of softener such as oil. However, this practice is not desirable for rubber products which are to be used for a long period, because oil migrates or volatilizes, causing other problems.

Some rubbers like high styrene SBR have an inherently high loss at normal temperature. On the other side of the coin, high styrene SBR is subject to high creep and has elastic moduli and loss characteristics which greatly vary depending on temperature. Therefore, its practical use is very limited by temperature. This problem is also the case with the above-mentioned rubber compound incorporated with a large amount of carbon and oil.

OBJECT AND SUMMARY OF THE INVENTION

It is an object of the present invention to provide an anti-seismic bearing which produces both an anti-seismic effect and a damping effect.

It is another object of the present invention to provide a durable anti-seismic bearing which is made of a rubber compound having high-loss characteristics as well as improved temperature dependence, failure characteristics, and adhesion properties.

The anti-seismic bearing of the present invention is made up of a plurality of rigid plates and viscoelastic flexible plates laminated alternately, with at least one of said flexible plates being made of a vulcanizate of a high-loss rubber compound composed of 100 parts by weight of rubber and 3 to 40 parts by weight of phenolic resin having a softening point or melting point of 150° C. or below, said vulcanizate having the properties specified below.

(i) The hysteresis ratio at 100% tensile deformation at 25° C. is 0.2 to 0.7.
(ii) The ratio $E_{(-10)}/E_{(30)}$ is 1.0 to 2.5, where $E_{(-10)}$ is a storage modulus at $-10°$ C. and $E_{(30)}$ is a storage modulus at 30° C., both dynamically measured at 5 Hz and 0.01% strain.

In general, a damper should preferably be made of a material having a high hysteresis loss. Unfortunately, such a material is more liable to creep and has an elastic modulus which is highly dependent on temperature. These properties are not desirable for anti-seismic bearings to support a building. The flexible plates constituting the anti-seismic bearing of the present invention have a hysteresis loss in a specific range and also have a modulus which is less dependent on temperature. Therefore, they enable the anti-seismic bearing to produce both an anti-seismic effect and a damping effect.

The flexible plates constituting the anti-seismic bearing of the present invention are made of a high-loss rubber compound incorporated with a phenolic resin. This rubber compound has not only high-loss characteristics but also improved temperature dependence, failure characteristics, and adhesion properties.

In search of a rubber compound having not only high-loss characteristics but also improved temperature dependence, failure characteristics, and adhesion properties, the present inventors carried out a series of researches, which led to the findings that a specific phenolic resin improves the processability of a rubber compound and takes part in chemical and physical reactions with rubber at the time of curing. To be more specific, a rubber compound incorporated with a phenolic resin has several advantages listed below over an ordinary rubber compound incorporated with process oil.
(1) High loss.
(2) Very little temperature dependence of elastic modulus for high loss.

(3) Small creep.
(4) Good adhesion to metal.
(5) Good stability, with almost no migration of process oil, over a long period of use.

The present invention was completed on the basis of these findings.

BRIEF DESCRIPTION OF THE DRAWINGS

FIGS. 1A and 1B are longitudinal sectional views of an embodiment of the anti-seismic bearing pertaining to the present invention.

FIGS. 3 and 4 and 7 to 12 are sectional views, FIG. 5 is a partly enlarged view of part V in FIG. 4, and FIG. 6 is an enlarged view of an important part pertaining to another embodiment.

DESCRIPTION OF THE PREFERRED EMBODIMENTS

Figure 2:
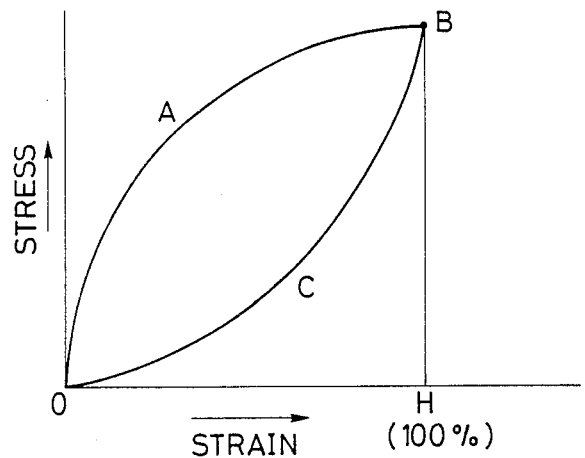
FIG. 2 is a graph showing the stress-strain curve of a material.

The following is a detailed description of the high-loss rubber compound from which are made the flexible plates of the anti-seismic bearing of the present invention.

According to the present invention, the high-loss rubber compound for the flexible plates is incorporated with a phenolic resin which has a softening point or melting point of 150° C. or below. Preferred examples of the phenolic resin include novolak phenolic resin and modified phenolic resin.

The novolak phenolic resin is characterized by the formaldehyde-to-phenol molar ratio which is about 0.6 to 1.0. It is produced by heating under reflux phenol and formalin in a kettle for a proper period of time, dehydrating the reaction product under vacuum or by standing, and removing residual water and unreacted phenol. The reaction is catalyzed by oxalic acid, hydrochloric acid, sulfuric acid, toluenesulfonic acid, or the like. Thus there is obtained a solid novolak having a melting point of 50° to 100° C.

This novolak comes in the form of lump, flake, or rod. Novolak as received does not cure upon heating. It is mixed with hexamine (as a hardener) and the mixture is crushed into powder before use. The amount of hexamine is usually 10 wt % of novolak. Hexamine may be replaced by solid resol. Solid novolak may be dissolved in an organic solvent to give a liquid novolak.

The modified phenolic resin is produced by modifying novolak phenolic resin with an oil such as rosin oil, tall oil, cashew oil, linolic acid, oleic acid, and linoleic acid, or an aromatic hydrocarbon such as xylene and mesitylene.

According to the present invention, the phenolic resin is incorporated in an amount of 3 to 40 parts by weight, preferably 5 to 30 parts by weight, into 100 parts by weight of rubber, so that the resulting rubber compound has desirable processability and loss characteristics.

The rubber into which the phenolic resin is incorporated is selected from natural rubber (NR), butadiene rubber (BR), styrene-butadiene rubber (SBR), ethylene propylene rubber (EPR, EPDM), butyl rubber (IIR), halogenated butyl rubber, and chloroprene rubber. They may be used in combination with one another.

According to the present invention, the rubber compound may be incorporated with the phenolic resin together with the following tackifiers for the improvement of elongation at break.

(1) Petroleum hydrocarbon resin such as cyclopentadiene resin or dicylcopentadiene resin in an amount of 2 to 40 parts by weight for 100 parts by weight of rubber.

(2) Rosin or rosin derivative in an amount of 2 to 20 parts by weight for 100 parts by weight of rubber.

The rubber compound used in the present invention may contain a filler, antioxidant, plasticizer, softener, oil, other compounding ingredients, according to need. The rubber compound provides a high-loss rubber upon vulcanization under normal conditions.

The vulcanizate of the rubber compound has the characteristic properties specified below.

(i) The hysteresis ratio at 100% tensile deformation at 25° C. is 0.2 to 0.7.

(ii) The ratio $E_{(-10)}/E_{(30)}$ is 1.0 to 2.5, where $E_{(-10)}$ is a storage modulus at $-10°$ C. and $E_{(30)}$ is a storage modulus at 30° C., both dynamically measured at 5 Hz and 0.01% strain.

These characteristic properties were specified for reasons mentioned in the following.

(i) Hysteresis ratio of a material:

In general, the value of loss tangent (tan δ) is used as a measure to represent the hysteresis loss characteristics and damping characteristics of a material. However, tan δ is not an adequate parameter to describe the hysteresis loss characteristics of a material for anti-seismic bearings which undergo as great deformation as 100 to 200% at the time of earthquake, because it is a quantity which is measured as the delay of response to the stimuli of very small amplitude applied to a material.

For this reason, in the present invention, the hysteresis ratio ($h_{100}$) of a material at 100% tensile deformation at 25° C. is used as a measure of the loss characteristics. Incidentally, the $h_{100}$ is given by the ratio of area OABCO to area OABHO in the stress-strain curve shown in FIG. 2 which is obtained at a stress rate of 200 mm/min.

As mentioned above, the $h_{100}$ should preferably be as great as possible from the standpoint of damping effect. However, a material having a high $h_{100}$ is subject to a large amount of plastic deformation. For a given material to be satisfactory in both characteristics, the value of $h_{100}$ at 25° C. should be in the range of $0.2 \leq h_{100} \leq 0.7$, preferably $0.25 \leq h_{100} \leq 0.65$, and most desirably $0.3 \leq h_{100} \leq 0.6$.

(ii) Temperature dependence of modulus of a material:

Many rubber products are used at varied temperatures depending on seasons. The atmospheric temperature would be as low as $-10°$ C. in winter and as high as 30° C. in summer. A rubber material becomes rigid at low temperatures because its modulus is dependent more or less on temperature. In addition, the temperature dependence is proportional to the loss of a material.

According to the present invention, the temperature dependence of the material should be as small as possible. To be more specific, the material should have storage moduli defined by the ratio of $E_{(-10)}/E_{(30)}$ which is in the range of 1.0 to 2.5, preferably 1.0 to 2.3, and most desirably 1.0 to 2.0, where $E_{(-10)}$ is a storage modulus at −10° C. and $E_{(30)}$ is a storage modulus at 30° C., both dynamically measured at 5 Hz and 0.01% strain.

The rubber compound mentioned above provides, upon vulcanization, a rubber having outstanding high-loss characteristics as well as good temperature dependence, failure characteristics, and adhesion properties. It effectively relieves and absorbs vibration energy. This high-loss rubber provides the anti-seismic bearing of the present invention with good elongation, temperature dependence, rubber-metal adhesion properties, and stability over a long period.

In what follows, we will explain the anti-seismic bearing of the present invention which contains the above-mentioned high-loss rubber.

The present inventors investigated an anti-seismic bearing made up of a plurality of rigid plates and viscoelastic flexible plates laminated alternately, which would produce both an anti-seismic effect and a damping effect if at least one of said flexible plates is made of a material having a high hysteresis loss. This investigation led to the following findings.

A material having a high hysteresis loss is desirable from the standpoint of dumber. On the other hand, such a material is more subject to creep and has an elastic modulus which is more temperature-dependent, and hence it is not suitable for anti-seismic bearings to support a building. Therefore, the material for the flexible plates should have a hysteresis loss value within a certain range and an elastic modulus which is less temperature-dependent.

These findings indicate that it would be possible to produce an ideal anti-seismic bearing which exhibits both an anti-seismic effect and a damping effect, if the above-mentioned high-loss rubber compound is used for the flexible plates of the anti-seismic bearing.

According to the present invention, the anti-seismic bearing 3 is made up of a plurality of rigid plates 1 and viscoelastic flexible plates 2 laminated alternately, with at least one of said flexible plates being made of a vulcanizate of the above-mentioned high-loss rubber compound, as shown in FIG. 1A. The anti-seismic bearing 3 may be provided with an upper flange 4 and a lower flange 5 as shown in FIG. 1B.

In this invention it is essential that at least one of the flexible plates should have the high-loss characteristics, and it is desirable that all the flexible plates have the high-loss characteristics.

In the case where the above-mentioned high-loss rubber compound and the other rubber compound are used in combination for the flexible plates, the latter should preferably have a hysteresis ratio which is 0.05 or above and lower than 0.20 at 100% tensile deformation at 25° C. and a ratio $E_{(-10)}/E_{(30)}$ of 1.0 to 1.5, where $E_{(-10)}$ and $E_{(30)}$ are storage moduli at −10° C. and 30° C., respectively, dynamically measured at 5 Hz and 0.01% strain.

The anti-seismic bearing as shown in FIG. 1B can be modified for improvement by one or more of the following six means.

Figure 3:
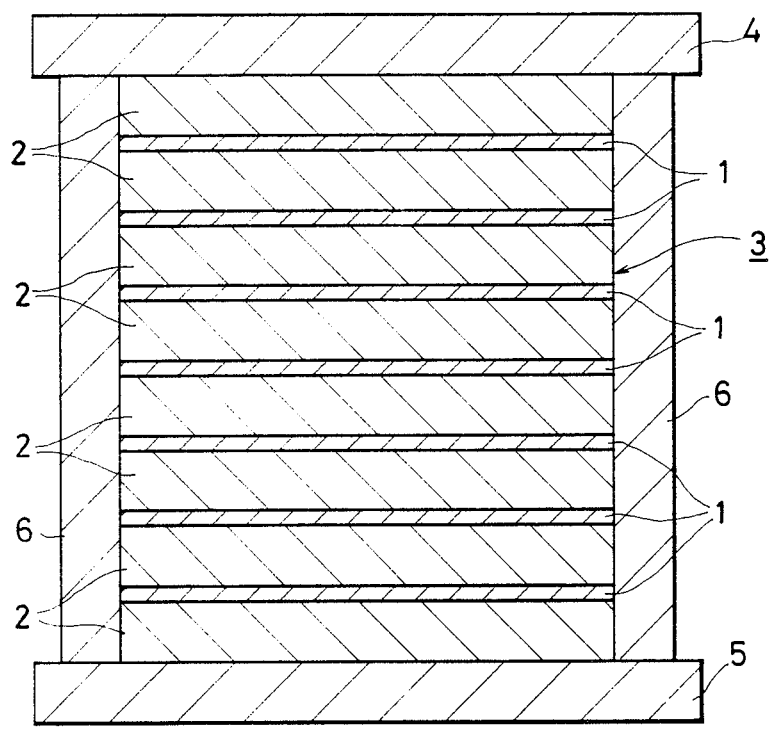
FIGS. 3 to 12 show some embodiments of the anti-seismic bearing pertaining to the present invention.

I: The exterior surface of the anti-seismic bearing 3 may be covered with a weather-resistant special rubber 6 as shown in FIG. 3, to improve the durability of the anti-seismic bearing.

Since the anti-seismic bearings are exposed to the atmosphere at all times while they are in use, they are degraded by air, moisture, ozone, ultraviolet light, radiation (if used for nuclear power stations), and sea wind (if used for seacoast buildings) over a long period of time. In addition, the anti-seismic bearings supporting a building receive a compressive load at all times, and the compressive load applies a considerable amount of tensile stress to the surface of the rubber layer. Moreover, the rubber layer is subjected to a local tensile strain of 100 to 200% in the case of great earthquake. Such tensile stress and tensile strain promote degradation. Therefore, it is desirable for the peripheral edges of the rigid plates 1 and flexible plates 2 of the anti-seismic bearing 3 to be covered with a special rubber layer 6 having superior weather resistance.

The rubber material used for the improvement of weather resistance includes, for example, butyl rubber, acryl rubber, polyurethane, silicone rubber, fluororubber, polysulfide rubber, ethylene propylene rubber (EPR and EPDM), Hypalon, chlorinated polyethylene, ethylene-vinyl acetate rubber, epichlorohydrin rubber, and chloroprene rubber. Preferable among them from the standpoint of weather resistance are butyl rubber, polyurethane, ethylene propylene rubber, Hypalon, chlorinated polyethylene, ethylene-vinyl acetate rubber, and chloroprene rubber. Preferable among them from the standpoint of adhesion to the rubber constituting the flexible plates are butyl rubber, ethylene propylene rubber, and chloroprene rubber.

These rubber materials may be used individually or in combination with one another. For the improvement of their physical properties, they may be blended with commercial rubber such as natural rubber, isoprene rubber, styrene butadiene rubber, butadiene rubber, and nitrile rubber. In addition, these rubber materials may be incorporated with additives such as filler, antioxidant, plasticizer, softener, and oil which are commonly used for rubber processing.

Among the above-mentioned covering rubber materials, ethylene propylene rubber is superior in ozone resistance, radiation resistance, oxidation resistance, UV light resistance, heat aging resistance, and low temperature resistance. Ethylene propylene rubber is improved in processability when it is incorporated with cyclopentadiene resin or dicyclopentadiene resin. In addition, these resins improve the properties of the rubber through the chemical and physical reactions with rubber that take place at the time of vulcanization.

In the case of a rubber compound composed mainly of ethylene propylene rubber, great improvement is achieved in adhesion to rubber and metal, processability, failure characteristics, and weather resistance if it is incorporated with at least one member selected from cyclopentadiene resin, cyclopentadiene resin derivatives, dicyclopentadiene resin, dicyclopentadiene resin derivatives, and cyclopentadiene or dicyclopentadiene polymers, and further a rosin derivative. The amount of the first component should be 5 to 50 parts by weight, preferably 15 to 35 parts by weight, and the amount of the second component should be 2 to 30 parts by weight, preferably 5 to 20 parts by weight, for 100 parts by weight of the rubber.

The cyclopentadiene resin or dicyclopentadiene resin to be incorporated into a rubber compound composed mainly of ethylene-propylene rubber may be the same one as mentioned above which is incorporated into natural rubber to prepare a high-loss rubber compound suitable as a material for the flexible plates.

The rosin derivative is a mixture of abietic acid and pimaric acid and similar carboxylic acids. It includes, for example, rosin ester, polymeric rosin, hydrogenated rosin, hardened rosin, high rosin, zinc resinate, and modified rosin.

The ethylene-propylene rubber includes ethylene-propylene diene rubber (EPDM) containing diene as a third component, ethylene-propylene rubber (EPR) not containing a third component, oil-extended ethylene-propylene diene rubber, and oil-extended EPR. The ethylene-propylene rubber may be blended with general-purpose rubber such as NR, BR, and SBR for the improvement of processability, according to need.

The high weather resistant rubber compound may be incorporated with a vulcanization accelerator selected according to the application. Their examples include thiazole type accelerators, guanidine type accelerators, thiuram type accelerators, and thiocarbamate type accelerators. Preferable among them are N-cyclohexyl-2-benzothiazole sulfenamide, dibenzothiazyl disulfide, tetramethylthiuram monosulfide, 2-mercaptobenzothiazole, 2-mercapto-benzothiazole cyclohexylamine salt, tetra-2-ethylhexylthiuram disulfide, zinc di-2-ethylhexyldicarbamate, and diphenylguanidine. Particularly desirable among them are N-cyclohexyl-2-benzothiazole sulfenamide and diphenyl guanidine. The desired amount of the vulcanization accelerator is 0.5 to 5 parts by weight. The high weather resistant rubber compound may contain a filler, antioxidant, plasticizer, softener, and oil which are commonly used for rubber processing.

The covering layer made of the above-mentioned rubber material should preferably be as thick as possible to produce the maximum effect of protecting the rubber inside. On the other hand, a thick covering layer increases the production cost and requires a prolonged vulcanization time. With these factors taken into account, the thickness of the covering layer should be 1 to 30 mm, preferably 2 to 20 mm, and more preferably 3 to 15 mm. In the case where the anti-seismic bearings are required to be fireproof, the covering layer may be thicker than 30 mm.

The covering layer may be firmly bonded to the rigid plates 1 and flexible plates 2 by any of the following methods.

(a) The rubber material for the flexible plates 2 (called internal rubber) and the special rubber material for the covering layer are vulcanized simultaneously and bonded to each other.

(b) The internal rubber and the special rubber are vulcanized in two stages sequentially and bonded to each other.

(c) The internal rubber and the special rubber are vulcanized separately and then they are bonded to each other with an adhesive.

The bonding of the internal rubber to the covering rubber may be promoted by interposing a third rubber layer between them which adheres well to both of them. In addition, the internal rubber and/or the special rubber may be incorporated with additives for the improvement of adhesion.

II: In the case where the anti-seismic bearing is provided with a covering layer as mentioned in I above, the edge of the rigid plate 1 is rounded off, so as to prevent excessive stress and strain leading to damage from occurring at the part where the edge of the rigid plate 1 comes into contact with the flexible plate 2.

The anti-seismic bearing composed of rigid plates and flexible plates laminated alternately has a disadvantage that an excessive stress concentrates at that part of the flexible plate which is in contact with the edge of the rigid plate and the concentrated stress damages that part. This disadvantage should preferably be overcome in this invention by rounding off the edge of the rigid plate and covering the rigid plates with a flexible material, thereby embedding the rigid plates in the flexible material.

Figure 4:
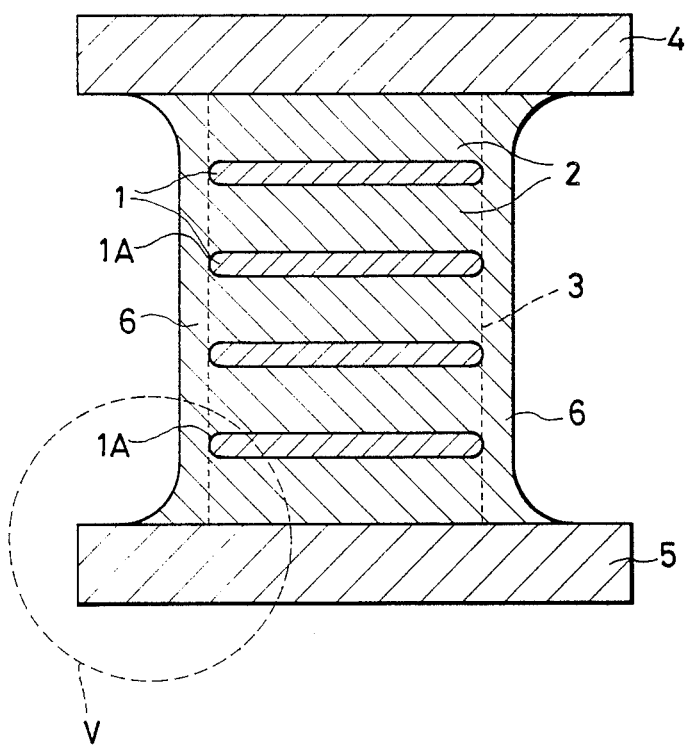

In the embodiment shown in FIG. 4, the rigid plates 1 are entirely covered with the special rubber 6, so that the rigid plates 1 are isolated from the air which causes corrosion. Covering the periphery 1A of the rigid plate 1 with the special rubber 6 and rounding off the periphery 1A of the rigid plate 1 minimize the local stress applied to the special rubber 6 that is in contact with the periphery 1A.

In this embodiment, the periphery of the rigid plate 1 should have a radius of curvature r (shown in FIG. 5 which is an enlarged detail of the part V in FIG. 4) which is defined by $h/4 \leq r \leq h$, preferably $h/3 \leq r \leq h(2/3)$ (where h represents the thickness of the rigid plate 1).

Figure 5:
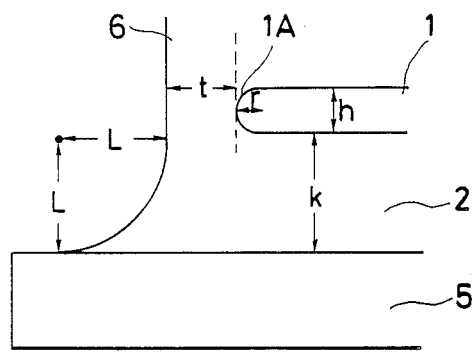
Figure 6:
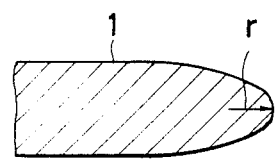

In the case where $r < h/2$, the peripheral curve should be connected to the straight part with a smooth transition curve as shown in FIG. 6. The embodiment shown in FIG. 6 produces the same effect as the embodiment shown in FIGS. 4 and 5.

The local stress that occurs in the special rubber which is in contact with the periphery of the rigid plate 1 is gradually reduced as the thickness of the flexible plate 2 is increased. However, the reduction of local stress levels off when the thickness goes beyond a certain limit. In this invention, therefore, the thickness t (mm) of the special rubber 6 should be in the range of $1 \leq t \leq 20$, preferably $2 \leq t \leq 15$, and most desirably $3 \leq t \leq 10$.

When an anti-seismic bearing composed of round iron plates, 3 mm thick and 220 mm in diameter (as rigid plates 1), and round rubber plates, 22 mm thick and 220 mm in diameter (as flexible plates 2), receives a load that compresses the rubber plate 2 by 4% on average, the rubber plate undergoes the maximum tensile strain as high as 55% if the edge of the iron plate is not rounded off. By contrast, in the case of the embodiment shown in FIGS. 4 and 5 (in which $r = h/2$ and $t = 5$ mm), the maximum tensile stress is reduced to 14%.

The round edge of the rigid plate 1 should have a radius of curvature which is 0.1 mm or over, preferably 0.3 mm or over, and most preferably 0.5 mm or over. The round edge does not need to have an exact arcuate shape; but it may take on any shape similar to an arc so long as it reduces the local stress.

III: The corners formed by the anti-seismic bearing 3 and the flanges 4 and 5 may be filleted arcuately as shown in FIG. 4. The fillet prevents the local strain from concentrating near the flange, thereby lowering the maximum local strain to a great extent and distributing the strain uniformly. Thus it is possible to protect the anti-seismic bearing from damage by local strain.

The fillet should have a radius of curvature L specified below.

$$1/15(h+k) \leq L \leq 5(h+k),$$

preferably $$1/12(h+k) \leq L \leq 4(h+k),$$

and most desirably $$1/10(h+k) \leq L \leq 3(h+k).$$

where h is the thickness of the rigid plate 1 and k is the thickness of the flexible plate 2 as shown in FIG. 5.

The arcuate fillet does not need to have an exact arcuate shape; but it may take on any shape similar to an arc so long as it reduces the local stress.

IV: The anti-seismic bearing may be made up of rigid plates each having different flexural rigidity and/or flexible plates each having different tensile stress as defined in (1) and (2) below.

(1) The rigid plate adjacent to the flange has a higher flexural rigidity than the rigid plates close to the center.

(2) The flexible plate adjacent to the flange has a higher tensile stress than the flexible plates close to the center.

This arrangement of rigid plates and flexible plates reduces local strain resulting from the flexural deformation of the rigid plate adjacent to the flange, thereby protecting the anti-seismic bearing from damage by local strain.

The anti-seismic bearings undergo great shear deformation as the building on them rocks during earthquake. This shear deformation leads to an extremely great local strain in the surface layer of the flexible plate adjacent to the flange of the anti-seismic bearing, and this local strain damages and breaks the anti-seismic bearing. Since this local strain results from the flexural deformation of the rigid plate adjacent to the flange, it can be prevented by arranging the rigid plates and flexible plates as mentioned in (1) and/or (2) above.

Figure 7:
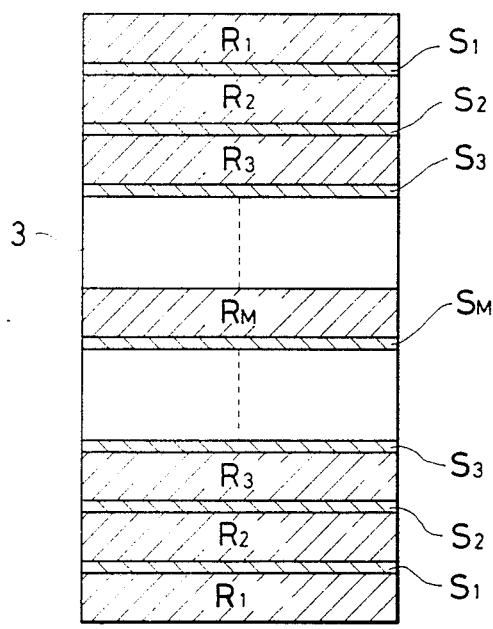

In the case of (1), the rigid plates each having different flexural rigidity should be arranged so as to meet the following requirements. Assuming that the rigid plates (such as steel plates) are designated $S_1, S_2, S_3, \ldots S_M$ ($S_M$ being at the center), as shown in FIG. 7, and they have flexural rigidity of $E_{S1}, E_{S2}, E_{S3}, \ldots E_{SM}$ at 25° C., respectively, the following relation should be established between the flexural rigidity $E_{S1}$ of the rigid plate $S_1$ and the flexural rigidity $E_{SM}$ of the rigid plate $S_M$.

$$1 < (E_{S1})/(E_{SM}) < 200,$$

preferably $$1 < (E_{S1})/(E_{SM}) < 75,$$

more preferably $$1 < (E_{S1})/(E_{SM}) < 50.$$

In addition, the following relation should be established between the flexural rigidity $E_{S2}$ of the rigid plate $S_2$ and the flexural rigidity $E_{SM}$ of the rigid plate $S_M$.

$$1 \leq (E_{S2})/(E_{SM}) < 50,$$

preferably $$1 \leq (E_{S2})/(E_{SM}) < 30.$$

If necessary, the flexural rigidity $E_{S3}$ of the rigid plate $S_3$ may be greater than the flexural rigidity $E_{SM}$ of the rigid plate $S_M$. In this case, the rigid plates $S_1, S_2, S_3, \ldots S_M$ may have the flexural rigidity of $E_{S1}, E_{S2}, E_{S3}, \ldots E_{SM}$, respectively, so that the following relation is established.

$$E_{S1} \geq E_{S2} \geq E_{S3} \geq \ldots \geq E_{SM}$$ (provided that the case in which $E_{S1} = E_{S2} = E_{S3} = \ldots = E_{SM}$ is excluded).

It is not always necessary to arrange the rigid plates sequentially according to their flexural rigidity. For example, it is possible that $E_{S1}, E_{S3}$, and $E_{S7}$ are greater than $E_{SM}$. In short, what is required in the present invention is that the rigid plates close to the flange should have higher flexural rigidity than the rigid plates close to the center. The flexural rigidity of the individual rigid plates should be properly established according to the estimated direction and magnitude of shocks applied to the anti-seismic bearings.

There are several possible ways to make the flexural rigidity of the rigid plate adjacent to the flange higher than that of the rigid plate close to the center. The following two ways are adequate.

(i) The rigid plates adjacent to the flange and the rigid plates close to the center are made of the same material, but the former is made thicker than the latter.

(ii) The rigid plates adjacent to the flange and the rigid plates close to the center are made of different materials, but the material for the former has a higher flexural rigidity than that for the latter.

Where (i) is employed, the thickness to give a desired flexural rigidity is easily calculated from the fact that the flexural rigidity is proportional to the cube of the thickness.

In the case of (2), the flexible plates each having different tensile stress should be arranged so as to meet the following requirements. Assuming that the flexible plates are designated $R_1, R_2, R_3, \ldots R_M$ ($R_1$ being adjacent to the flange and $R_M$ being at the center) and they have tensile stress of $E_{R1}, E_{R2}, E_{R3}, \ldots E_{RM}$, respectively, at 100% elongation (modulus 100) at 25° C., the following relation should be established between the tensile stress $E_{R1}$ of the flexible plate $R_1$ and the tensile stress $E_{RM}$ of the flexible plate $R_M$.

$$1 < (E_{R1})/(E_{RM}) < 50,$$

preferably $$1 < (E_{R1})/(E_{RM}) < 30,$$

more preferably $$1 < (E_{R1})/(E_{RM}) < 15.$$

In addition, the following relation should be established between the tensile stress $E_{R2}$ of the flexible plate $R_2$ and the tensile stress $E_{RM}$ of the flexible plate $R_M$.

$$1 \leq (E_{R1})/(E_{RM}) < 15,$$

preferably $$1 \leq (E_{R1})/(E_{RM}) < 10.$$

If necessary, the tensile stress $E_{R3}$ of the flexible plate $R_3$ may be greater than the tensile stress $E_{RM}$ of the flexible plate $R_M$. The flexible plates $R_1, R_2, R_3, \ldots R_M$ may have the tensile stress of $E_{R1}, E_{R2}, E_{R3}, \ldots E_{RM}$, respectively, so that the following relation is established.

$$E_{R1} \geq E_{R2} \geq E_{R3} \geq \ldots \geq E_{RM}$$ (provided that the case in which $E_{R1} = E_{R2} = E_{R3} = \ldots = E_{RM}$ is excluded).

It is not always necessary to arrange the flexible plates sequentially according to their tensile stress. For example, it is possible that $E_{R1}, E_{R3}$, and $E_{R7}$ are greater than $E_{RM}$.

There are several possible ways to make the tensile stress of the flexible plate adjacent to the flange higher than that of the flexible plate close to the center. The following two ways are adequate.

(i) The flexible plates adjacent to the flange and the flexible plates close to the center are made of the same material, but the former is incorporated with more filler than the latter.

(ii) The flexible plates adjacent to the flange and the flexible plates close to the center are made of different materials, but the material for the former has a higher tensile stress than that for the latter.

According to the present invention, it is desirable that the flexible plate $R_M$ at the center should have a tensile stress $E_{RM}$ of 5 to 40 kg/cm$^2$ at 100% elongation at 25° C. The above-mentioned arrangement reduces the local strain resulting from the flexural deformation of the rigid plate adjacent to the flange. This minimizes the possibility that the anti-seismic bearing is damaged and broken by local strain.

Figure 8:
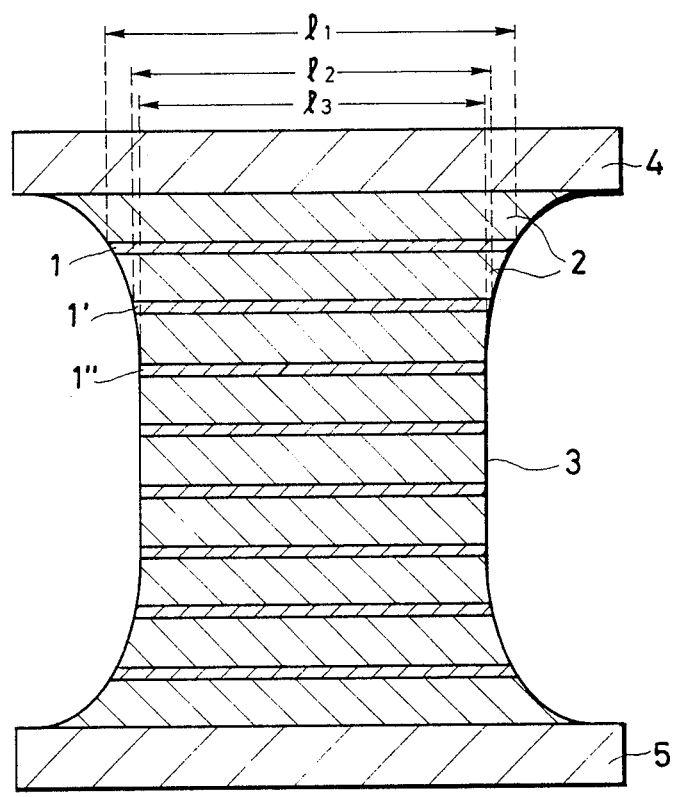

V: The anti-seismic bearing may be made up of rigid plates and flexible plates each having a different diameter. The plates are arranged in the order of their diameter, with the plate of the largest diameter being adjacent to the flange and the plate of the smallest diameter being close to the center, as shown in FIG. 8. The diameter of each plate should be such that the line tracing the edges of the plates form an arcuate curve as shown in FIG. 8.

This arrangement prevents local strain from concentrating in the vicinity of the flange and distributes strain uniformly in the anti-seismic bearing. Moreover, it also prevents buckling and protects the anti-seismic bearing from damage by local strain and buckling.

Assuming that the rigid plates 1, 1', 1'', ... have diameters $l_1$, $l_2$, $l_3$, ..., respectively, the following relation should be established, $$l_1 > l_2 > l_3 ...$$

so that the longitudinal section of the anti-seismic bearing has inwardly curved sides as shown in FIG. 8.

Figure 9:
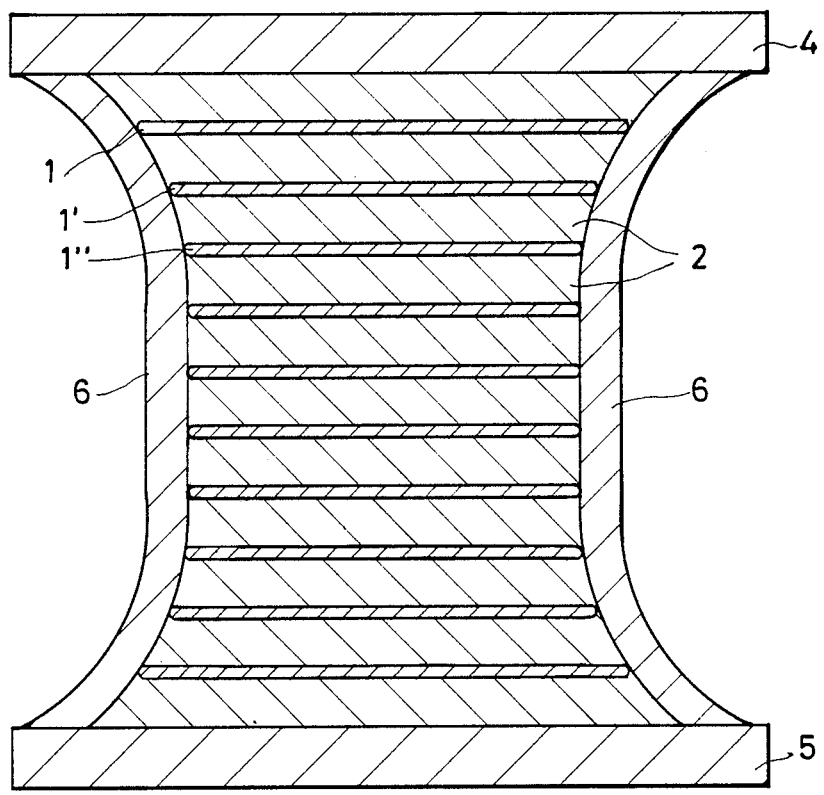

The anti-seismic bearing mentioned in V may be further modified as mentioned in I and II above, in which case the anti-seismic bearing will have a structure as shown in FIG. 9 and will produce the effects mentioned above.

VI: The anti-seismic bearing may be constructed such that the peripheral part has higher rigidity than the central part. This construction prevents local strain from concentrating in the peripheral part of the anti-seismic bearing, especially in the peripheral part of the flexible plates. Thus it is possible to reduce the maximum local strain to a great extent. This may be accomplished in the following way (1) or (2) or both.

Figure 10:
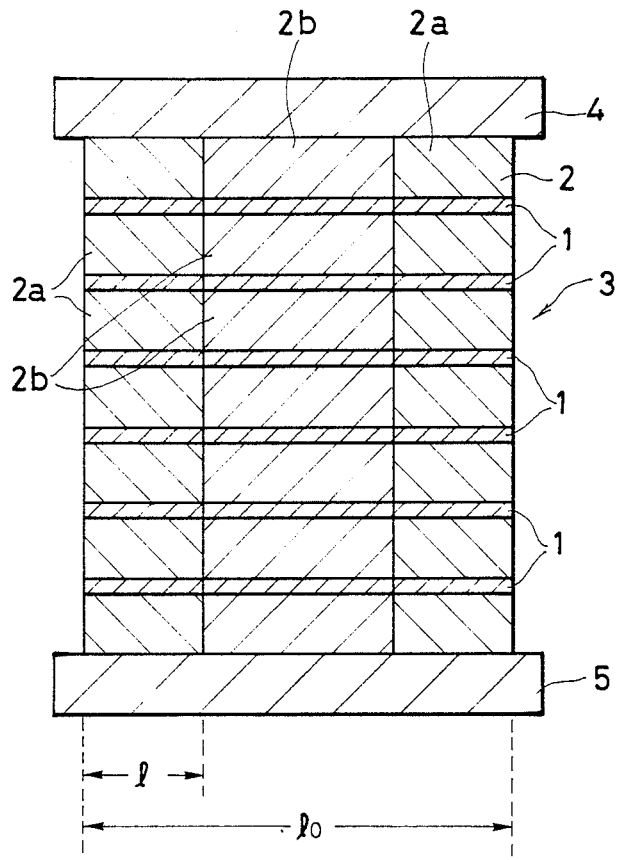

(1) The first way is by constructing the anti-seismic bearing with two-piece flexible plates 2, each having a more rigid peripheral part 2a and a less rigid inner part 2b, as shown in FIG. 10. Such a flexible plate may be formed by producing the peripheral part and inner part from different materials and joining them together.

The materials should be selected so that the peripheral part and inner part of the flexible plate have elastic moduli ($E_{out}$) and ($E_{in}$), respectively, which are defined as follows:

$$1.3 \leq (E_{out})/(E_{in}) \leq 20,$$

preferably $$1.5 \leq (E_{out})/(E_{in}) \leq 10,$$

more preferably $$2.0 \leq (E_{out})/(E_{in}) \leq 8.$$

In the case where the flexible plates are made of the above-mentioned high-loss rubber compound, the peripheral part may be prepared from the one containing a large amount of phenolic resin having a softening point or melting point of 150° C. or below, and the central part, from the one containing a small amount of the phenolic resin.

Figure 11:
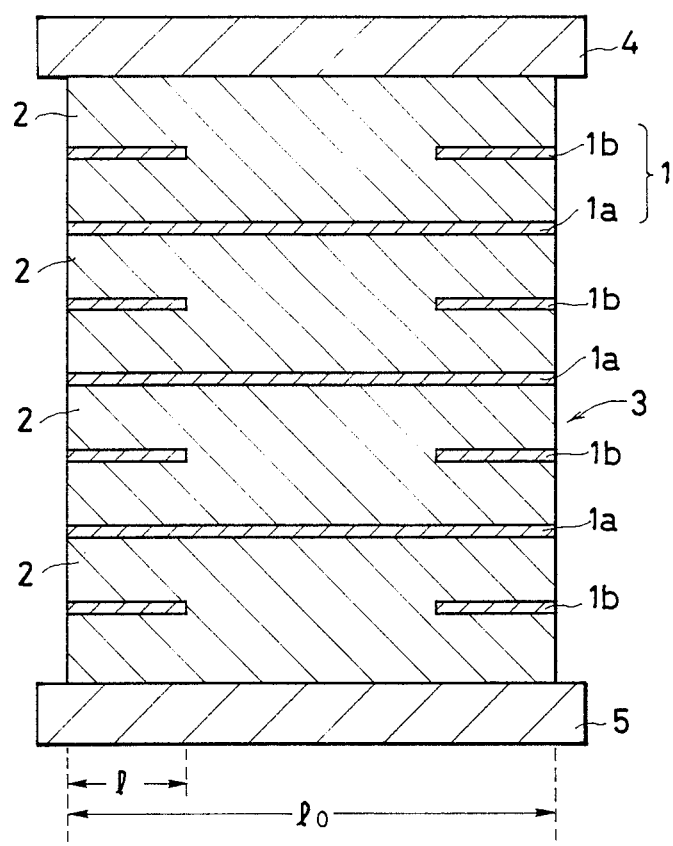

(2) The second way is by increasing the number of the rigid plates in the peripheral part of the anti-seismic bearing 3, as shown in FIG. 11. In this case, ordinary rigid plates 1a and annular rigid plates 1b are arranged alternately.

In both cases of (1) and (2), there should be the following relation between the diameter ($l_0$) of the anti-seismic bearing 3 and the width (1) of the peripheral part which is made more rigid than the central part as shown in FIGS. 10 and 11.

$$1 \leq l_0/2$$

preferably $$1 \leq l_0/3.$$

Figure 12:
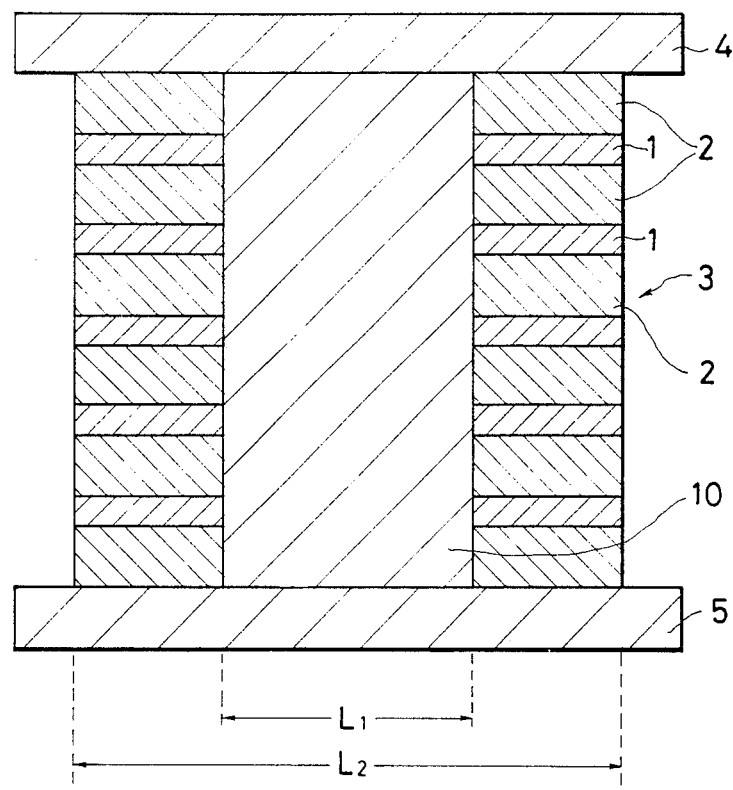

In the meantime, the anti-seismic bearing as mentioned above should preferably be provided with a damper in the hollow formed at its center, as shown in FIG. 12, so that it produces a powerful damping effect as well as an anti-seismic effect. In this case, the cylindrical hollow should have a diameter $L_1$ defined as follows:

$$L_1/L_2 \leq 0.7,$$

preferably $$L_1/L_2 \leq 0.5,$$

where $L_2$ denotes the diameter of the anti-seismic bearing.

The damper should be made of a viscoelastic material such as:
unvulcanized rubber, slightly vulcanized rubber, or vulcanized rubber, with or without a filler.
resin, viscous material, or resin incorporated with a plasticizer.
FRP.

The one having the following properties (a) and (b) is preferable.

(a) A hysteresis ratio ($h_{100}$) at 100% tensile deformation (pull speed 200 mm/min) at 25° C. which is higher than that of the above-mentioned high-loss rubber by 0.1, especially 0.2.

(b) A storage modulus (E) at 25° C. dynamically measured at 5 Hz and 0.01% strain which is within the range of $1 \leq E \leq 2 \times 10^4$ (kg/cm$^2$), especially $5 \leq E \leq 1 \times 10^4$ (kg/cm$^2$).

The anti-seismic bearing provided with the above-mentioned damper made of a specific viscoelastic material having superior hyteresis characteristics produces a very good damping effect over a broad range of deformation.

The size of the damper 10 relative to the size of the anti-seismic bearing 3 is not specifically limited but is properly selected according to the intended use of the anti-seismic bearing. Preferably, there should be the following relation between the diameter $L_1$ of the hollow and the diameter $L_2$ of the anti-seismic bearing.

$$L_1/L_2 \leqq 0.80,$$

preferably $$L_1/L_2 \leqq 0.70,$$

more preferably $$L_1/L_2 \leqq 0.64.$$

According to the present invention, the rigid plate 1 may be made of metal, ceramics, plastics, FRP, polyurethane, wood, paperboard, slate, or decorative laminate.

The flexible plates and rigid plates may be circular, square, pentagonal, hexagonal, or polygonal. The bonding of the rigid plates 1 to the flexible plates 2 may be accomplished with an adhesive or by covulcanization.

The above-mentioned high-loss rubber compound is outstanding not only in loss characteristics but also in temperature dependence, failure characteristics, and adhesion. Therefore, it is very useful for anti-seismic bearing and exhibits its characteristic properties in any environment over a long period of time.

Not only does the anti-seismic bearing of the present invention exhibit an anti-seismic function but it also isolates and damps vibrations.

The invention will be described in more detail with reference to the following examples and comparative examples.

EXPERIMENT EXAMPLE 1

Rubber compounds as shown in Table 1 were prepared and the physical properties of their vulcanizates were examined. The results are shown in Table 1.

It is noted from Table 1 that the rubber compound No. 6 (comparative example) has a storage modulus which is highly temperature-dependent because it contains a large amount of aromatic oil, and the rubber compound No. 7 (comparative example) is poor in loss characteristics. By contrast, the rubber compounds Nos. 1 to 5 (working examples) incorporated with a specific phenolic resin have good loss characteristics and storage moduli which are less temperature-dependent.

TABLE 1

| | No. | | | | | | |
|---|---|---|---|---|---|---|---|
| | 1 | 2 | 3 | 4 | 5 | (6) | (7) |
| Composition (parts by weight) | | | | | | | |
| Rubber | NR50 BR50 | NR50 BR50 | NR67 BR33 | NR67 BR33 | NR33 BR67 | SBR 100 | NR 100 |
| Carbon | 50 | 50 | 50 | ISAF40 | ISAF45 | 90 | FT23 |
| Phenolic resin*[1] | 10 | 15 | 20 | 20 | 10 | — | — |
| Dicyclopentadiene resin | — | 5 | — | — | 10 | — | — |
| Aromatic oil | — | — | — | — | — | 95 | 8 |
| Sulfur | 1.5 | 1.5 | 1.5 | 1.5 | 1.5 | 1.5 | 1.5 |
| Hexamethylenetetramine | 0.5 | 0.5 | 0.5 | 0.5 | 0.5 | 0.5 | — |
| Physical properties | | | | | | | |
| Loss characteristics, $h_{100}$*[2] | 0.33 | 0.42 | 0.40 | 0.39 | 0.40 | 0.45 | 0.15 |
| Temperature dependence $E_{(-10)}/E_{(30)}$*[3] | 1.22 | 1.21 | 1.19 | 1.19 | 1.25 | 2.85 | 1.11 |

Example No. in parenthesis denotes Comparative Example.
*[1]Novolak phenolic resin having a melting point of 130° C.
*[2]$h_{100}$ denotes the ratio of hysteresis at 100% tensile deformation at 25° C. It is a measure of loss characteristics. It is given by the ratio of area OABCO to area OABHO in the stress-strain curve shown in FIG. 2 which is obtained at a pull speed of 200 mm/min.
*[3]The ratio of the storage modulus at −10° C. to the storage modulus at 30° C., dynamically measured at 12 Hz and 0.01% strain. It serves as an index for temperature dependence.

EXPERIMENT EXAMPLE 2

Rubber compounds were prepared according to the formulations shown in Table 2, and their physical properties were examined. The results are shown in Table 2. All the data measured at 25° C.

It is noted from Table 2 that the rubber compounds No. 12 and 13 (Comparative Examples) have a low elongation at break and are poor in adhesion to iron plates and especially natural rubber. In contrast, the weather-resistant rubber compounds Nos. 8 to 11 which are incorporated with dicyclopentadiene resin and high rosin have a high elongation at break and breaking strength and are superior in adhesion to metal and natural rubber compounds.

TABLE 2

| | No. | | | | | |
|---|---|---|---|---|---|---|
| | 8 | 9 | 10 | 11 | (12) | (13) |
| Composition (parts by weight) | | | | | | |
| Rubber | | | | | | |
| EPDM alone | — | — | — | — | — | 100 |
| EPDM/NR = 70/30 | 100 | 100 | 100 | 100 | 100 | — |
| ISAF carbon | 40 | 40 | 40 | 40 | 30 | 30 |
| Dicylcopentadiene resin*[1] | 18 | 27 | 14 | 21 | — | — |
| High rosin | 9 | 10 | 14 | 9 | — | — |
| Spindle oil | — | — | — | — | 20 | 20 |
| Sulfur | 1.5 | 1.5 | 1.5 | 1.5 | 1.5 | 1.5 |
| Vulcanization accelerator*[2] | | | | | | |
| CZ | 2.7 | 2.5 | 2.5 | 2.5 | — | — |

TABLE 2-continued

| | No. 8 | 9 | 10 | 11 | (12) | (13) |
|---|---|---|---|---|---|---|
| TS | — | — | — | — | 2.3 | 2.3 |
| DPG | — | — | — | 1 | — | — |
| Antioxidant, 810NA | 1 | 1 | 1 | 1 | 1 | 1 |
| Physical properties | | | | | | |
| Modulus at 100% elongation (kg/cm$^2$) | 17 | 11 | 14 | 14 | 23 | 19 |
| Elongation at break (%) | 700 | 840 | 800 | 780 | 370 | 280 |
| Breaking strength (kg/cm$^2$) | 141 | 110 | 152 | 156 | 78 | 80 |
| Rubber/rubber bond strength (kg/inch)[*3] | 70 | 50 | 70 | 80 | 20 | 6 |
| Rubber/metal bond strength (kg/inch)[*4] | 87 | 80 | 80 | 87 | 40 | 35 |

Example No. in parenthesis denotes Comparative Example.
[*1]Polymer of dicyclopentadiene, having a softening point of 116° C. and a bromine number of 65.
[*2]CZ: N-cyclohexyl-2-benzothiazole sulfenamide
TS: Tetramethylthiuram monosulfide
DPG: Diphenyl guanidine
Antioxidant 810NA: N-isopropyl-N'-phenyl-p-phenylenediamine
[*3]Adhesion of the specimen to a natural rubber compound (Rubber compound No. 17 mentioned later)
[*4]Adhesion of the specimen to a metal plate

EXPERIMENT EXAMPLE 3

The weather resistance of rubber compounds Nos. 8 to 10 shown in Table 2 was compared with that of an ordinary natural rubber compound (No. 17) which is composed of 100 parts by weight of natural rubber, 20 parts by weight of HAF carbon, 10 parts by weight of spindle oil, 1.5 parts by weight of sulfur, and 1 part by weight of antioxidant. The results are shown in Table 3.

TABLE 3

| | No. 14 | 15 | 16 | 17 |
|---|---|---|---|---|
| Rubber compound | No. 8 | No. 9 | No. 10 | NR compound |
| Ozone resistance[*1] | No cracking even after 200 hours | | | Many cracks after 2 hours |
| Heat aging resistance[*2] | | | | |
| Retention of elongation at break | 0.77 | 0.80 | 0.75 | 0.30 |
| Retention of breaking strength | 0.74 | 0.82 | 0.72 | 0.09 |
| Cycles of flexing until fracture | $7 \times 10^3$ | $12 \times 10^3$ | $5 \times 10^3$ | 20 |

[*1]Specimen stretched 50%, in 90 pphm, at 40° C.
[*2]Measured at 25° C. after heat-aging in an air oven at 100° C. for 20 days.

It is noted from Table 3 that the high weather resistant rubber compounds suitable for use in the invention are superior in ozone resistance, and have high retention values of elongation, breaking strength, and flex resistance after heat aging. Apparently, they are outstanding in heat aging resistance.

EXAMPLE 1 AND COMPARATIVE EXAMPLE 1

Figure 13:
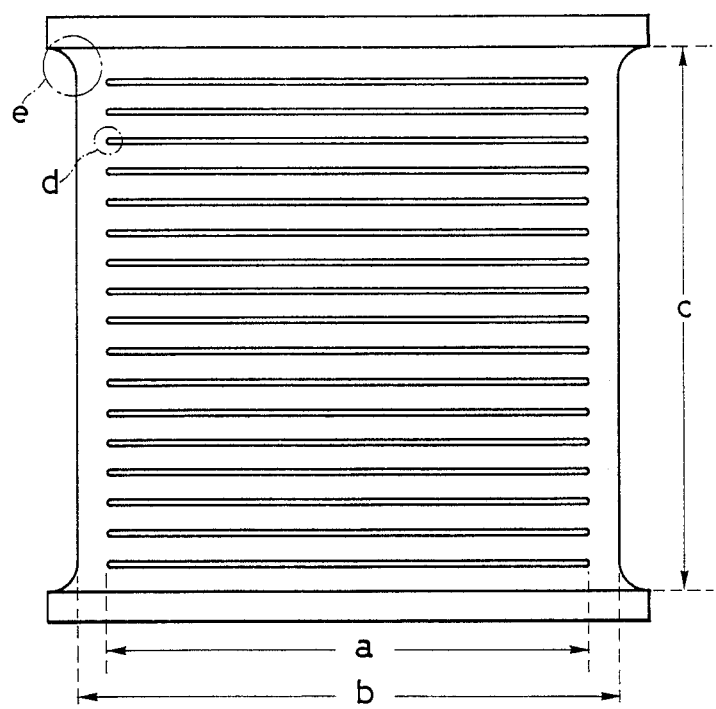
FIG. 13 is a schematic diagram of the anti-seismic bearing produced in Example 1 and Comparative Example 1.

An anti-seismic bearing of the present invention as shown in FIG. 13 was prepared, in which the flexible plates were made of the rubber compound designated as No. 5 in Table 1. An anti-seismic bearing for comparison was also prepared in the same manner as above, except that the flexible plates were made of the rubber compound designated as No. 7 in Table 1. The anti-seismic bearings were examined for damping effect.

Dimensions of the anti-seismic bearing shown in FIG. 13.

a = 160 mm
b = 164 mm
c = 53 mm
d = arcuate cross-section having a radius of curvature (r) of 1 mm (as defined in FIG. 5)
e = arcuate cross-section having a radius of curvature $L = \frac{1}{3}(h+k)$, where L, h, and k are defined in FIG. 5.

Dimensions of the flexible plates 2 mm thick (k) × 18 layers (= 36 mm)

Dimensions of the rigid plates (iron plates)

1 mm thick (h) × 17 layers (= 17 mm)

Conditions of measurements

Figure 14:
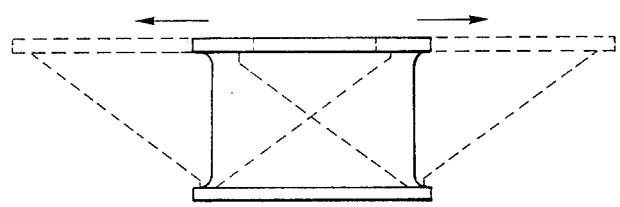
FIG. 14 is a schematic diagram showing the deformation of the anti-seismic bearing produced in Example 1 and Comparative Example 1.

Temperature: room temperature (25° C.)
Vibration: 0.5 Hz in two directions (see FIG. 14)
Load in vertical direction: 30 kg/cm$^2$
Shear strain in horizontal direction: 100%

The damping effect was represented in terms of "Equivalent Viscous Damping Coefficient" which is commonly used in the fields of building and mechanical engineering to denote the damping effect of laminated rubber products.

The results are shown in Table 4.

TABLE 4

| | Example 1 | Comparative Example 1 |
|---|---|---|
| Rubber compound | Compound No. 5 | Compound No. 7 |
| Equivalent viscous damping coefficient | 0.15 | 0.025 |

It is noted from Table 4 that the anti-seismic bearing of the present invention produces an outstanding anti-seismic effect.

The specification refers to the disclosure of application Ser. No. 007,302 filed on Jan. 27, 1987.

What is claimed is:

1. An anti-seismic bearing comprising a plurality of rigid plates and viscoelastic flexible plates laminated alternately, with at least one of said flexible plates being made of a vulcanizate of a high-loss rubber compound composed of 100 parts by weight of rubber and 3 to 40 parts by weight of phenolic resin having a softening point or melting point of 150° C. or below, said vulcanizate having the properties specified below;
    (i) the hysteresis ratio at 100% tensile deformation at 25° C. is 0.2 to 0.7;
    (ii) the ratio $E_{(-10)}/E_{(30)}$ is 1.0 to 2.5, where $E_{(-10)}$ is a storage modulus at $-10°$ C. and $E_{(30)}$ is a storage modulus at 30° C., both dynamically measured at 5 Hz and 0.01% strain;
    said high-loss rubber compound containing a tackifier defined in (iii) and/or (iv) below;
    (iii) petroleum hydrocarbon resin in an amount of 2 to 40 parts by weight for 100 parts by weight of rubber,
    (iv) rosin or rosin derivative in an amount of 2 to 20 parts by weight for 100 parts by weight of rubber.

2. An anti-seismic bearing set forth in claim 1, wherein the phenolic resin is a novolak phenolic resin or modified phenolic resin.

3. An anti-seismic bearing set forth in claim 1, wherein the high-loss rubber compound is composed of 100 parts by weight of rubber and 5 to 30 parts by weight of phenolic resin.

4. An anti-seismic bearing set forth in claim 1, wherein the petroleum hydrocarbon resin is cyclopentadiene resin or dicyclopentadiene resin.

5. An anti-seismic bearing set forth in claim 1, wherein the flexible plates are made of a material having the properties specified below;
    (i) the hysteresis ratio at 100% tensile deformation at 25° C. is 0.25 to 0.65;
    (ii) the ratio $E_{(-10)}/E_{(30)}$ is 1.0 to 2.3, where $E_{(-10)}$ is a storage modulus at $-10°$ C. and $E_{(30)}$ is a storage modulus at 30° C., both dynamically measured at 5 Hz and 0.01% strain.

6. An anti-seismic bearing set forth in claim 1, wherein the peripheral parts of the rigid plates and flexible plates are covered with a rubber material having good weather resistance.

7. An anti-seismic bearing set forth in claim 6, wherein the weather resistant rubber compound is one which is composed of 100 parts by weight of rubber whose principal component is ethylene-propylene rubber, 5 to 50 parts by weight of cyclopentadiene resin and/or dicyclopentadiene resin, and 5 to 20 parts by weight of rosin derivative.

8. An anti-seismic bearing set forth in claim 7, wherein the weather resistant rubber compound is one which is composed of 100 parts by weight of rubber whose principal component is ethylene-propylene rubber, 10 to 40 parts by weight of cyclopentadiene resin and/or dicyclopentadiene resin, and 5 to 20 parts by weight of rosin derivative.

9. An anti-seismic bearing set forth in claim 6, wherein the weather resistant rubber compound forms a covering layer which is 1 to 30 mm thick.

10. An anti-seismic bearing set forth in claim 6, wherein the rigid plates have rounded peripheral edges.

11. An anti-seismic bearing set forth in claim 1, wherein the rigid plates have rounded peripheral edges which are covered with a viscoelastic flexible material.

12. An anti-seismic bearing set forth in claim 1, wherein at least the rigid plate located outside has a higher flexural rigidity than that close to the center; or the flexible plate located outside has higher tensile stress than that close to the center.

13. An anti-seismic bearing set forth in claim 1, wherein at least an outermost plate is inwardly curved such that the area of cross-section gradually increases as the cross-section gets near the outside.

14. An anti-seismic bearing set forth in claim 1, wherein rigid plates of different diameters are combined with one another and at least an outermost plate is inwardly curved such that the area of cross-section gradually increases as the cross-section gets near the outside.

15. An anti-seismic bearing set forth in claim 1, wherein the peripheral part of the bearing has higher rigidity than the inner part.

* * * * *